United States Patent
Soltanpur et al.

(10) Patent No.: US 10,321,169 B1
(45) Date of Patent: Jun. 11, 2019

(54) INTERFERENCE PROFILE OF A BURSTY CHANNEL

(71) Applicant: VIAVI SOLUTIONS INC., Milpitas, CA (US)

(72) Inventors: Cinna Soltanpur, Indianapolis, IN (US); Vincent Michael Zipparo, Shelbyville, IN (US); Daniel Keith Chappell, Greenwood, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 15/829,778

(22) Filed: Dec. 1, 2017

(51) Int. Cl.
*H04N 21/24* (2011.01)
*H04N 21/266* (2011.01)
*H04B 10/2575* (2013.01)
*H04N 21/61* (2011.01)
*H04L 27/26* (2006.01)

(52) U.S. Cl.
CPC ... *H04N 21/2402* (2013.01); *H04B 10/25751* (2013.01); *H04L 27/2628* (2013.01); *H04N 21/266* (2013.01); *H04N 21/6118* (2013.01); *H04N 21/6168* (2013.01)

(58) Field of Classification Search
CPC ............. H04N 21/2402; H04N 21/266; H04N 21/6118; H04N 21/6168
See application file for complete search history.

(56) References Cited

U.S. PATENT DOCUMENTS

| | | | |
|---|---|---|---|
| 6,215,514 B1 | 4/2001 | Harris | |
| 6,292,944 B1 | 9/2001 | Harris | |
| 6,895,043 B1* | 5/2005 | Naegeli | H04L 12/2801 370/459 |
| 7,003,414 B1* | 2/2006 | Wichelman | G01R 23/163 324/76.19 |
| 7,152,025 B2* | 12/2006 | Lusky | H04L 1/0001 703/18 |
| 7,197,067 B2* | 3/2007 | Lusky | H04L 1/0001 375/224 |
| 7,489,641 B2* | 2/2009 | Miller | H04L 12/2801 370/241.1 |
| 8,904,460 B2* | 12/2014 | Zinevich | G01S 5/06 725/107 |
| 9,197,886 B2* | 11/2015 | Nair | H04N 17/004 |

OTHER PUBLICATIONS

Gardner, William A. "Cyclostationarity in communications and signal processing". Statistical Signal Processing Inc Yountville CA, 1994, 260 pages.

Riba, Jaume, Javier Villares, and Gregori Vázquez. "A nondata-aided SNR estimation technique for multilevel modulations exploiting signal cyclostationarity." IEEE transactions on signal processing 58.11 (2010), pp. 5767-5778.

* cited by examiner

*Primary Examiner* — Nicholas T Corbo
(74) *Attorney, Agent, or Firm* — Mannava & Kang, P.C.

(57) ABSTRACT

A network test instrument is operable to generate an interference profile for a bursty channel of a cable television network. Frequency spectrum data of a received signal is cross-correlated with predetermined frequency spectrum data to identify traces representative of noise. The interference profile may be built from the traces.

20 Claims, 8 Drawing Sheets

INTERFERENCE PROFILE OF A BURSTY CHANNEL

BACKGROUND

Service provider networks typically deliver services, such as digital television, high-speed Internet, Voice-over-IP (VoIP), etc., to customer premises. Service provider networks, including cable networks, have, in recent years, moved beyond merely broadcasting television signals over a coaxial cable to subscribers in their homes. The networks typically carry bi-directional traffic. For example, in addition to receiving data and broadcasts, subscribers of a cable network have a modem allowing the transmission of digital signals upstream toward a headend of the network. Among many services afforded by cable modems are Internet services, voice-over-Internet-Protocol (VoIP) phone services, etc.

Noise in a cable transmission system has always been problematic. For example, in a cable television (CATV) upstream communication system, where signals are transmitted upstream from the customer premise to the headend, a carrier-to-noise ratio (CNR) or a signal-to-noise ratio (SNR) can be used as a measure of signal integrity to identify an existing problem, like ingress noise, in the upstream channel. However, a CNR or SNR value itself does not readily identify the root cause for noise or interference in the signal.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
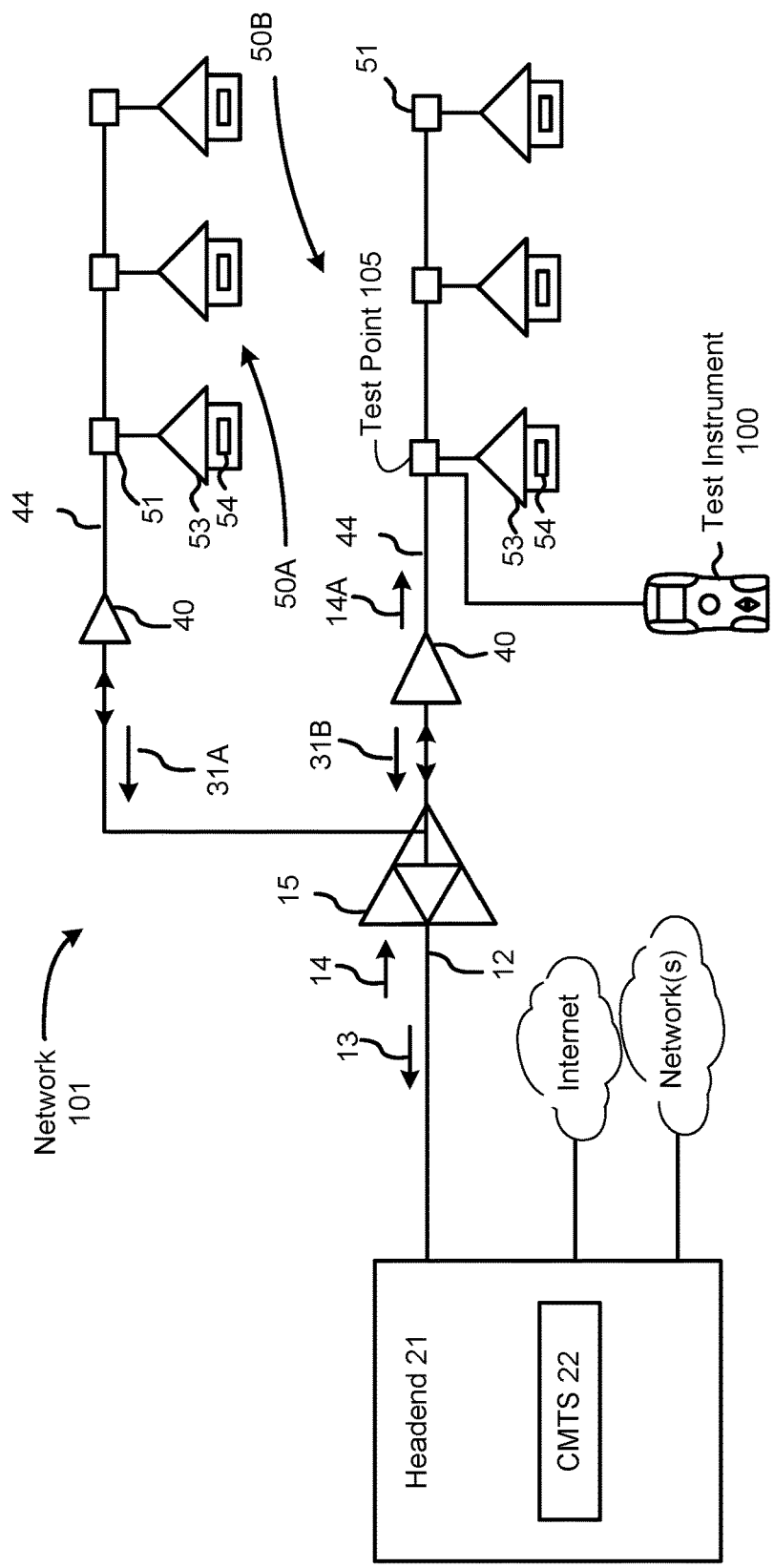
FIG. 1 illustrates a network, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, and the term "including" means including but not limited to. The term "based on" means based at least in part on.

A cable television network may include a two-way hybrid fiber-coaxial (HFC) network that supports point-to-multipoint transmission in the downstream direction using digital signals or a mix of analog and digital signals, and multipoint-to-point transmission in the upstream direction. Downstream signals, which carry broadcast digital TV signals, Internet traffic, etc., may be distributed via a fiber optic connection from a headend to a node that converts the optical signals to electrical signals and then distributes the signals to customer premises via a tree and branch coaxial cable distribution network termed 'cable plant.' Recently, service providers are running fiber to the customer premises to improve bandwidth. At the customer premises, terminal equipment, including cable modems, may support delivery of downstream services. Upstream signals from the customer premise may propagate from the branches of the cable plant towards the headend of the network. The upstream and downstream signals are prone to interference, which may be caused by varying sources originating at or near various locations in the network. For instance, there may be numerous devices, cable segments and connectors located between or near the fiber optic node and the customer premises equipment where defects can occur. Such defects, impairments, or other sources of interference, among other things, can negatively impact signal quality. As described above, carrier-to-noise ratio (CNR) or signal-to-noise (SNR) may help identify existence of a problem, like ingress noise, in an upstream channel, but a CNR or SNR value itself does not readily identify the source of the noise or interference.

According to an example of the present disclosure, a test instrument is connectable to the cable network to test and measure for signal interference and to determine interference profiles of the signal interference, which can be used to determine the cause of the signal interference. For example, the test instrument can connect to a test point in the cable network to access an upstream path in the network. The upstream path may be between customer premises equipment, such as a cable modem, and a headend in the cable network.

The test instrument may include a receiver to receive the upstream signal transmitted on the upstream path, and may include a measurement circuit to measure signal parameters of the upstream signal. The measured signal may be gathered as a frequency response that is amplitude-versus-frequency components of received signals. In an example, the measurement circuit includes a Fast Fourier Transform (FFT) unit that takes a time varying input signal, such as the upstream signal, and computes its frequency spectrum, e.g., FFT data. For example, the measurement circuit may include an FFT spectrum analyzer that samples the input signal (e.g., received test signal), computes the magnitude of its sine and cosine components, and from the magnitudes determines the spectrum of these measured frequency components. An interference profile is generated from the FFT data that is determined to represent noise, as is further discussed below. The interference profile may include a representation, in the frequency domain, of noise in the upstream channel or in any bursty channel. Based on the shape of the interference profile, the source of the noise may be determined. For example, if the shape of the interference profile resembles the shape of a neighboring quadrature amplitude modulation channel, then the noise may be caused by the neighboring channel. If the shape of interference profile is a continuous wave, then the source of the noise may be a component transmitting a signal on the same frequency as the measured channel.

As used herein, the term "packet" refers to a unit of data forwarded between an origin and a destination in a network. Each packet typically includes a payload (e.g., carrying information) and headers (e.g., carrying meta-data) that can include various layers (e.g., sub-layer headers) of meta-data. In a general sense, a "channel" refers to an information transfer path within a system (e.g., (Data-Over-Cable Service Interface Specifications (DOCSIS) networks), and the mechanism by which the path is created. The information may be transmitted over a channel with the help of a quadrature amplitude modulation (QAM) which refers to an analog radio frequency channel that uses QAM (e.g., a modulation technique in which an analog signal's amplitude and phase vary to convey information, such as digital data). A QAM channel may include single carrier QAM (SC-QAM) or a legacy DOCSIS 3.0 channel. Orthogonal frequency-division multiplexing (OFDM) may be used in a digital multi-carrier modulation method introduced in DOCSIS 3.1. A "bursty" channel refers to a channel in which data is transmitted or received in a series of intermittent operations or "bursts," and normally suggests that some threshold has been reached to trigger the burst. A bursty channel generally refers to an upstream channel, but does not exclude a downstream channel because a downstream channel may also, at times, transmit or receive data in a series of intermittent bursts as well.

FIG. 1 illustrates a network, according to an example of the present disclosure. In this network, the test instrument may be used to measure interference. More specifically, the test instrument may be used to generate an interference profile. The test instrument is shown as test instrument 100. In this example, the network 101 is a cable TV network, but the test instrument 100 may be used in other types of networks. Network 101 shown in FIG. 1 may be a portion of a cable TV network that delivers cable TV signals, including digital TV signals and data and control signals, to end users at customer premises 53 in the downstream direction, and receives and forwards data and other signals from the customer premises 53 in the upstream direction. The network 101 may include a hybrid fiber coaxial network or other type of cable TV network. The network 101 includes a headend 21. Upstream signals are transmitted from the customer premises 53 to the headend 21, and downstream signals are transmitted from the headend 21 to the customer premises 53. The headend may include a cable modem termination system (CMTS) 22. The CMTS 22 may handle DOCSIS (Data-Over-Cable Service Interface Specifications) signals and an edge quadrature amplitude modulation (EQAM) for video signals and perform other functions known to be performed by headends in cable TV networks.

Downstream radio frequency (RF) signals 14 transmitted from the headend 21 may be distributed to a plurality of end-of-the-line subscribers or end users, for example, via one or more trunk coaxial cables 44 and subscriber taps 51. At the customer premises 53, the downstream signals may be demodulated using cable modems 54, which may be connected to customer premises equipment (not shown), such as wireless routers, set top boxes, smart televisions, personal computers, smartphones, etc.

Upstream RF signals may be transmitted from the customer premises 53 towards the headend 21. The first and second groups of customer premises 50A and 50B may send upstream signals 31A and 31B, respectively, which may be combined by the bidirectional amplifier 15 into the upstream RF signal 13 propagating towards the headend 21. In an example, the upstream RF signal 13 may be converted to an optical signal at a fiber node (not shown) between the customer premises 53 and the headend 21, and the fiber node transmits the upstream signal to the headend 31.

The network 101 may serve a large number of customer premises 50A and 50B, which may be connected by taps 51 to a plurality of trunks coaxial cables 44 at a plurality of different locations. The trunk cables 44 may be buried in the ground or they may be elevated above the ground on utility poles, or a combination of both. One or more two-way trunk RF amplifiers 40 may be provided in each of the trunk cables 44 to suitably amplify the upstream and downstream CATV signals on their way to and from the customer premises 53. In other examples, fiber cables may be run to the home and the test instrument 100 may connect to the fiber cables.

The headend 21 may include CMTS 22 and may control and setup data paths in the network 101. The CMTS 22 may support the DOCSIS MAC protocol and upper layer DOCSIS protocols. The CMTS may perform signaling functions, downstream and upstream bandwidth time slot scheduling, and DOCSIS framing. The CMTS 22 or other circuits in the headend 21 may provide video processing functions. The headend 21 may send and receive video and data via the Internet or via other networks 36.

The test instrument 100 may be connected to the network 101 at any desired test point to measure signals transmitted in the network 101. For example, the test instrument 100 is shown as connected to test point 105. The test instrument 100, however, may be connected at any location where connections are available to connect to the network 101. The test points may include test points having access to upstream channels in the network 101, such as a location in the network 101 between the headend 21 and a customer premises 53. The test instrument 100 may be connected to the network 101 via a test access point (tap).

The test instrument 100 may include one or more ports to connect to the test point 105. In an example, the port(s) include coaxial RF cable connectors. It will be appreciated that test instrument 100 may also have other non-cable ports, for example, to connect to a computer or to an external display, such as, but not exclusively, one or more USB ports and the like. The test instrument 100 may receive upstream channels in the network 101 and measure the power of the signals and determine FFT data for generating interference profiles as is further discussed below. For example, the test instrument 100 may determine the frequency response of upstream channels, such as DOCSIS carriers for carrying traffic from customer premises 53, based on FFT data of the upstream signals measured by the test instrument 100. The test instrument 100 may also determine other signal quality information, such as modulation error ratio (MER), in-band group delay, micro-reflections, impulse noise, a number of captured symbols in the upstream data packet, a number of erroneously detected symbols in the upstream data packet, a constellation map, and an RF power level, and display the signal quality information. The FFT data and other signal quality information measured by the test instrument 100 may be processed and used to generate an interference profile, e.g., an ingress noise profile, as discussed in more detail below. The interference profile may have a certain shape, and that shape may indicate, suggest, or correspond to a source or root cause of noise or signal impairment, which is helpful to a technician. For instance, the shape of the interference may indicate that signal interference in the channel may be the result of short radio wave radio, excessive gain on a path, device malfunction, broadband noise from appliances, etc. Knowing the cause of the noise may lead to quicker repair and improvement of signal quality.

FIG. 1 depicts the network 101. It should be appreciated that the network 101 may represent a portion of a cable plant. The cable plant may have multiple fiber nodes and multiple branches between the headend 21 and the customer premises 53.

Figure 2:
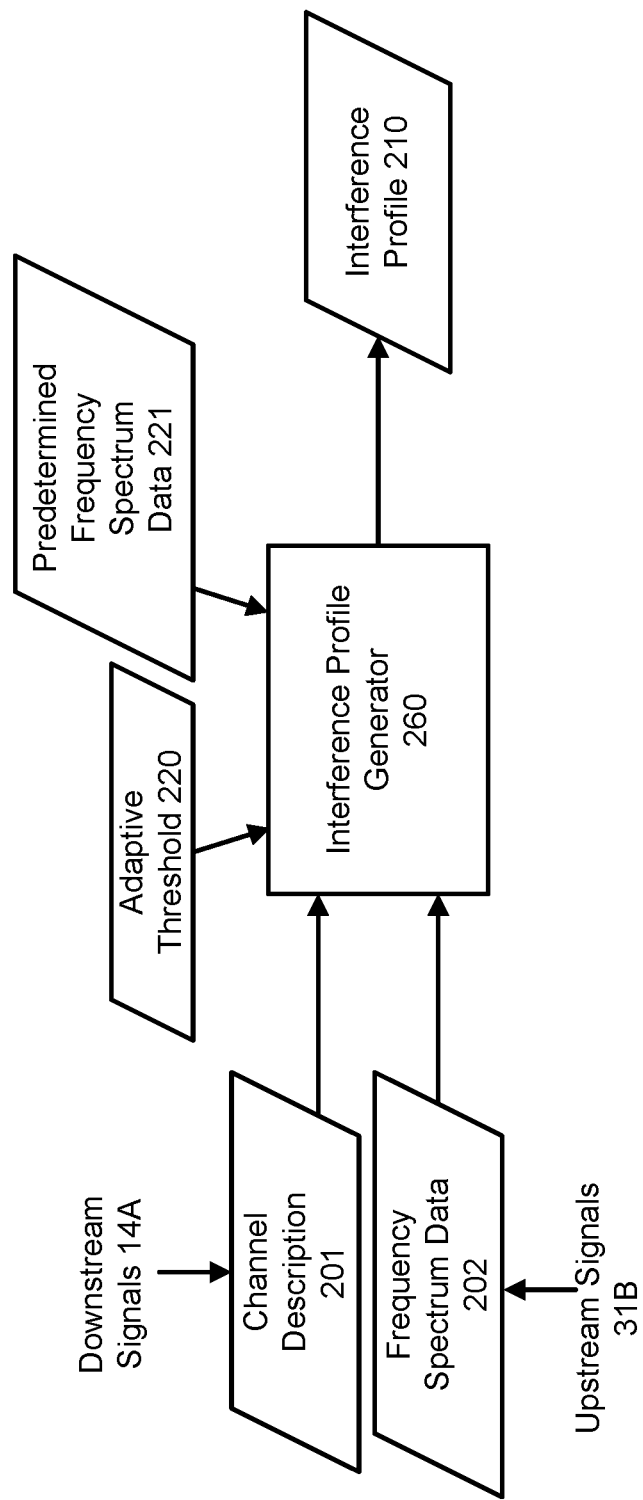
FIGS. 2-3 illustrate data flow diagrams for generating an interference profile, according to examples of the present disclosure.

FIG. 2 illustrates a simplified data flow diagram for interference profile generation. An interference profile generator 260 uses channel information in channel description 201 and frequency spectrum data 202 to generate interference profile 210. The channel description 201 and the frequency spectrum data 202 may be determined from downstream and upstream signals, respectively, that are transmitted in the network 101. The interference profile generator 260, for example, is in the test instrument 100. The test instrument 100 may connect to the network 101 via the test point 105.

The test instrument 100 may determine the channel description 201 from the data provided by CMTS 22 in downstream signals 14A received by the test instrument 100 when connected to the test point 105. Based on the DOCSIS standards, downstream signals broadcasted from the headend 21 over the downstream path, such as from the headend 21 to the customer premises 53, provide information about upstream channels transmitted in the upstream path from the customer premises 53 to the headend 21. The channel description 201 may include frequency information, modulation type, etc. The channel description 201 may also include details about start and stop frequencies for each upstream channel. The start and stop frequencies, which may specify a range of frequencies between and including the start and stop frequencies for the upstream channel, are used by the test instrument 100 to measure parameters of the upstream channel. The channel description 201 may be provided in a DOCSIS Upstream Channel Descriptor (UCD) periodically transmitted from the CMTS 22. The channel description 201 may be collected and stored in local memory of the test instrument 100.

The test instrument 100 may determine the frequency spectrum data 202 for the upstream signals 31B transmitted in the upstream channel by measuring the signal according to the channel description 201. The frequency spectrum of signal 202 for example can be represented by FFT data of the upstream signals 31B received at the test instrument 100. In an example, the test instrument 100 may include a real-time spectrum analyzer that measures the FFT data in discrete time of finite lengths. For example, the upstream signal is measured for windows of certain period of time, each having a specific length, and FFT is calculated for each window. The windows may be overlapped to increase the visibility of time varying events. For example, a window function is applied and then the FFT is applied to determine a trace of FFT data for each window. A trace includes a FFT of a time-domain signal captured in the window. Examples of a window function that may be applied include a Hamming window or a Hann window. This technique is called windowing. The traces may be buffered, and the interference profile generator 260 generates the interference profile 210 from the traces that are determined to be representative of noise. Windowed FFTs in a bursty communication channel may introduce artifacts to the received signal, so a median filter may be applied to minimize FFT data outliers that may be caused by artifacts. For example, a median filter may replace each point of FFT data with the median (rather than the average) of m adjacent points, where m is an integer greater than 1. This helps eliminate outliers and may generate a more accurate interference profile.

The interference profile generator 260 may include additional inputs for determining the interference profile 210 of the upstream signals 31B. For example, the interference profile generator 260 may determine whether traces of FFT data of a received bursty channel represent a signal transmitted in the bursty channel or represent just the noise when a signal is not transmitted in the bursty channel. For example, the interference profile generator 260 cross-correlates the frequency spectrum data 202 with predetermined frequency spectrum data 221. The predetermined frequency spectrum data 221 includes frequency spectrum data that is expected for an upstream, for example QAM signal, transmitted in the upstream channel. The output of the cross-correlation is compared to an adaptive threshold 220 to determine whether the FFT trace of the frequency spectrum data 202 represents noise or an upstream signal. The threshold 220 may be adaptive to compensate for different power levels and other factors that may vary depending on the location of the test point in the network 101 where the test instrument 100 is connected for measuring the upstream signal parameters. If the FFT trace is determined to represent noise, it is buffered with other noise FFT traces to generate the interference profile 210. Generating interference profiles is discussed in more detail below. Once an interference profile is generated, it may be outputted to a display.

Figure 3:
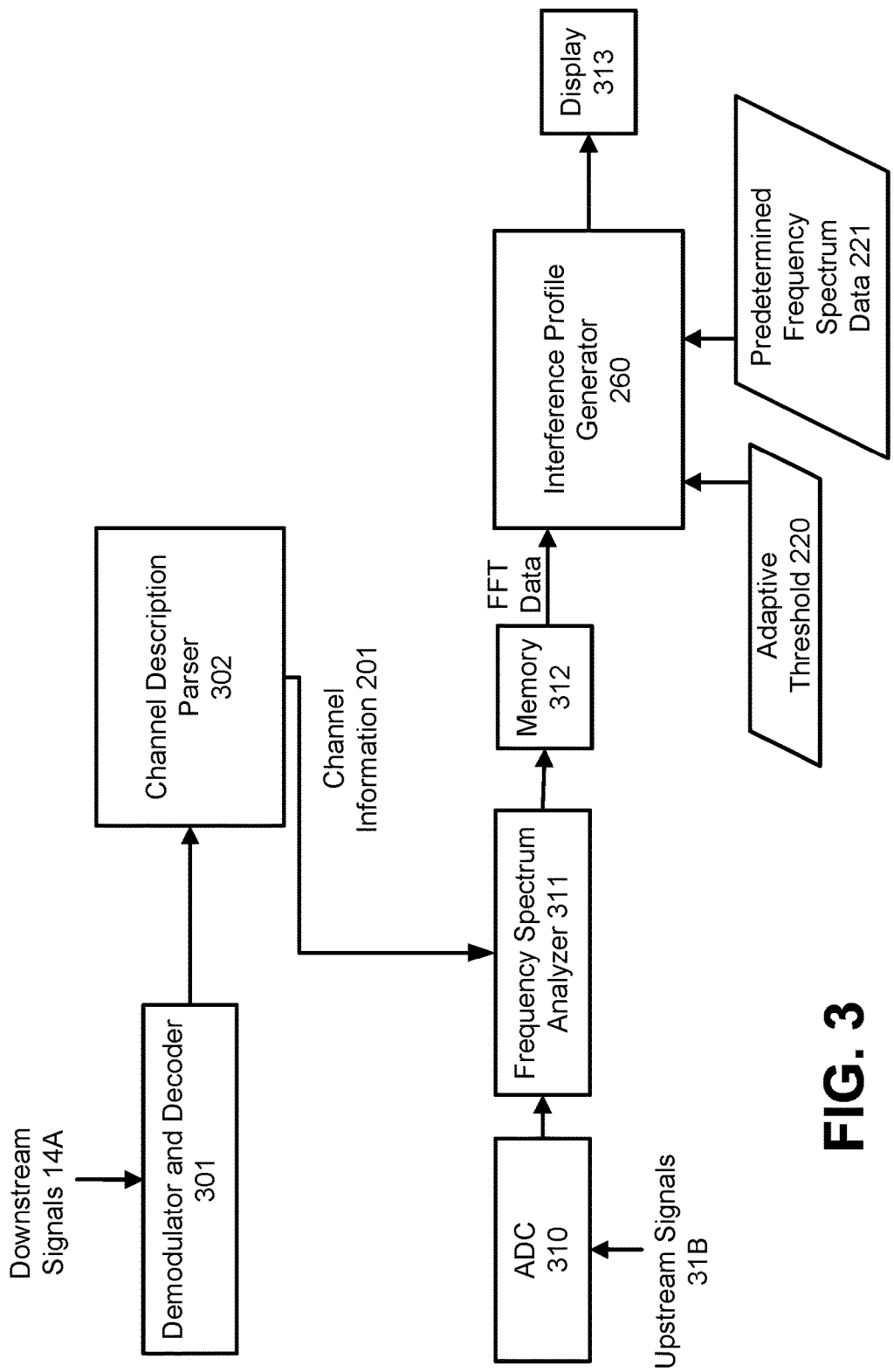

FIG. 3 shows a more detailed data flow diagram, including components of the test instrument 100 for building interference profiles. For example, the test instrument 100 may include a demodulator and decoder 301 for demodulating and decoding the downstream signals 14A to determine the channel description 201 carried in the downstream signals 14A. The test instrument 100 may include a channel description parser 302 that extracts the channel description 201 from the decoded downstream signals and provides start and stop frequencies for the upstream channel, which are determined from the channel description 201, to frequency spectrum analyzer 311.

The test instrument 100 may include an analog-to-digital converter (ADC) 310 that converts signals received via the test point 105 to digital signals. The signal received via the test point 105 may include the upstream signals 31B transmitted from customer premises 53 to headend 21 and may include noise. The frequency spectrum analyzer 311 determines FFT data for overlapping windows of the upstream channel as is discussed above. The FFT data may be stored in memory 312. The interference profile generator 260 determines the FFT data for noise and the FFT data for upstream signals based on the predetermined frequency spectrum data 221 and the adaptive threshold 220 as is discussed above, and as is further explained below. The FFT data for the noise is used to generate the interference profile 210 of the upstream signals 31B, and the interference profile 210 may be displayed on display 313.

Figure 4:
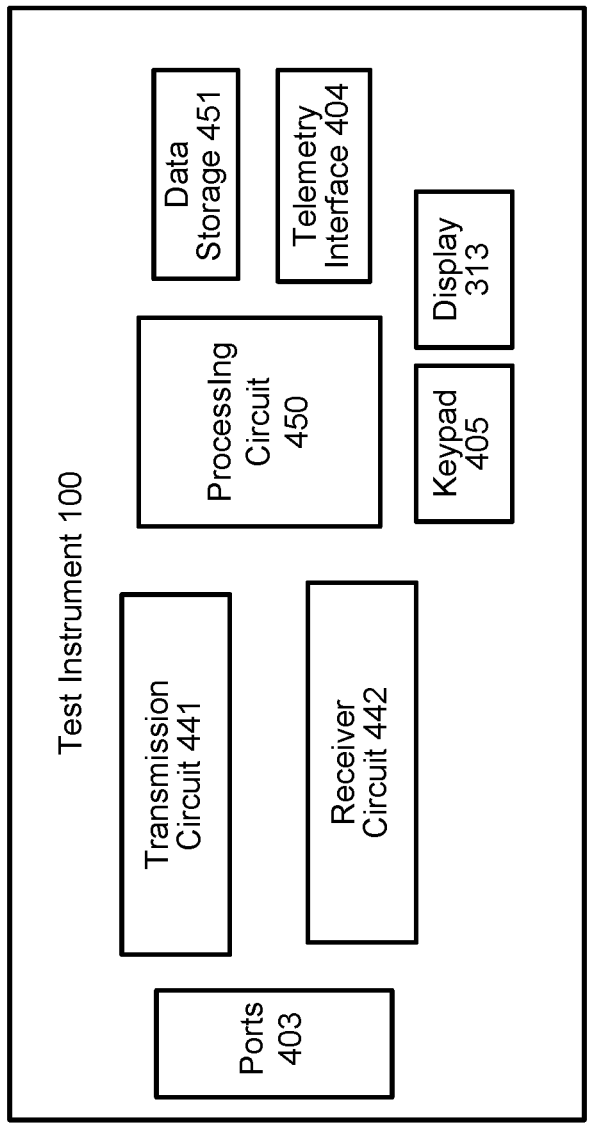
FIG. 4 illustrates a test instrument, according to an example of the present disclosure.

FIG. 4 shows a high-level block diagram of the test instrument 100, according to an example. The test instrument 100 may include components other than shown. The test instrument 100 may include one or more ports 403 for connecting the test instrument 100 to a test point, such as the test point 105 shown in FIG. 1. The ports 403 may include connectors for connecting to cables in the network 101 carrying traffic for upstream and downstream channels. The traffic may include video, voice and data packets, etc. The test instrument 100 may include a telemetry interface 404 for connecting to a telemetry channel, such as a WiFi interface, Bluetooth interface, cellular interface or another network interface. The test instrument 100 may connect to a remote device via the telemetry interface 404.

The test instrument 100 includes a user interface which may include a keypad 405 and display 313. The display 313 may include a touch screen display. A user may interact with the test instrument 100, such as to enter information, select operations, view measurements, view interference profiles, etc., via the user interface.

A data storage 451 may store any information used by the test instrument 100 and may include memory or another type of known data storage device. The data storage 451 may store FFT data, power level measurements and/or any other measurements or data used by the test instrument 100. The data storage 451 may include a non-transitory computer readable medium storing machine-readable instructions executable by processing circuit 450 to perform operations of the test instrument 100. The memory 312 shown in FIG. 3 may be part of the data storage 451.

Transmission circuit 441 may include a circuit for sending test signals upstream to perform various tests, such as frequency sweep tests. The transmission circuit 441 may include encoders, modulators, and other known component for transmitting signals in the network 101. Receiver circuit 442 may include components for receiving signals from the network 101. The components may include components shown in FIG. 3, such as demodulator and decoder 301, ADC 310, and other known components.

Processing circuit 450 may include any suitable hardware to perform the operations of the test instrument 100 described herein, including the operations described with respect to FIGS. 2-3 and the methods described herein. The operations include measuring and testing operations, including determining signal parameters for upstream and downstream signals transmitted in the network 101 and determining interference profiles for signals transmitted in the network 101. The processing circuit 450 may include one or more of the components shown in FIG. 3, such as the interference profile generator 260, frequency spectrum analyzer 311 and channel description parser 302. The hardware of the test instrument 100, including the processing circuit 450, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 450 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

In an example, a technician wishing to test the upstream path at the test point 105 may connect the test instrument 100 to the test point 105 via the ports 403. The technician may select via the keypad 405 to generate an interference profile for an upstream channel. The test instrument 100 may receive upstream signals via the test point 105 and generate an interference profile for the upstream channel on the display 313. The technician may view the interference profile and compare the interference profile to other profiles to determine a source of ingress noise. Also, the technician may view other signal parameters determined by the test instrument 100, such as power, SNR, modulation error rate (MER), bit error rate (BER), etc. The signal parameters and interference profiles may be determined for upstream or downstream signals and displayed on the display 313.

Figure 5:
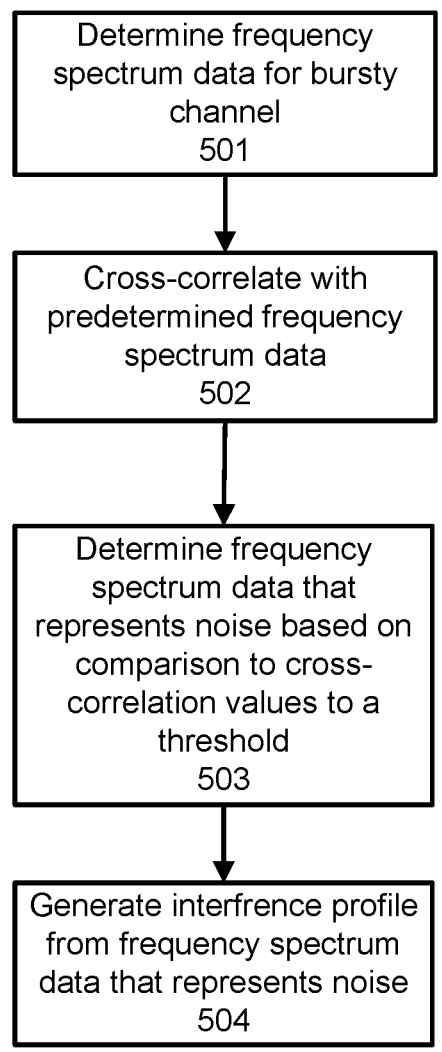
FIGS. 5-6 illustrate methods, according to examples of the present disclosure.

FIG. 5 illustrates a method 500 for generating an interference profile, according to an example. The method 500 is provided by way of example, as there may be a variety of ways to carry out the method described herein. Although the method 500 is primarily described as being performed by interference profile generator 260 of the test instrument 100, the method 500 may be executed or otherwise performed by test instrument 100, e.g., at the processing circuit 450, or by another system or a combination of systems. Each block shown in FIG. 5 may further represent one or more processes, methods, or subroutines, and one or more of the blocks may include machine readable instructions stored on a non-transitory computer readable medium and executed by a processor or other type of processing circuit to perform one or more operations described herein.

At 501 in the method 500, frequency spectrum data is determined for a signal received from a bursty channel. An example of a bursty channel is an upstream channel used by cable modems 54 which transmit data to the headend 21 in bursts of signals, for example, according to a time division multiple access (TDMA) scheme. For example, the test instrument 100 is connected to an upstream path in the network 101, such as via test point 105. The test instrument 100 receives signals from the upstream channel via one of its ports 403 connected to the test point 105. The signals may include signals transmitted from cable modems 54 to the headend 21 and may include noise. Noise may include unwanted signals that interfere with the signals transmitted from cable modems 54 to the headend 21. The source of the noise may be anything, such as short-wave radio, excessive gain on the path, a malfunctioning device, broadband noise from appliances, etc. The processing circuit 450 determines frequency spectrum data for the received signals. The frequency spectrum data may be the FFT of the received signal. For example, the frequency spectrum analyzer 311 may determine the FFT trace for overlapping time windows for the received signals. The FFT trace may be determined for a particular upstream channel defined by start and stop frequencies, such as a range of frequencies for the upstream channel. The start and stop frequencies may be determined from the channel description 201. The signal profile of the received signal transmitted in the bursty channel or the signal profile of the unwanted noise in the bursty channel (e.g., if no signal is being transmitted in the bursty channel) can be the power spectral density of the signal received from the bursty channel, which is determined from the FFT of the received signal. The power spectral density describes the power that is present in the signal as a function of frequency, such as watts per hertz.

At 502, the frequency spectrum data is cross-correlated with predetermined frequency spectrum data, such as a predetermined frequency spectrum of an intended signal, to generate cross-correlation values. For example, the processing circuit 450 cross-correlates the FFT data for each window with FFT data from the predetermined frequency spectrum data. The predetermined frequency spectrum data for example is a power spectral density of a signal without noise transmitted in the upstream channel. In an example, that signal may be a QAM signal transmitted in the upstream channel without noise. The predetermined frequency spectrum data is the power spectral density of a QAM signal transmitted in the upstream channel without noise. Cross-correlation is a measure of similarity of two series as a function of the displacement of one relative to the other. Cross-correlation may be used to detect similarities between signals. In this example, the cross-correction values may be used to determine whether the frequency spectrum data indicates a strong presence of noise in a signal. Cross-correlation calculations can be performed in the frequency domain by a cross-correlation function well-known in the art.

At 503, the processing circuit 450 determines the frequency spectrum data that represents noise profile based on a comparison of the cross-correction values to a threshold, such as adaptive threshold 220. For example, FFT data for each window is cross-correlated with the predetermined frequency spectrum data to determine a cross-correlation value for the window, and the cross-correlation value for the window is compared to the adaptive threshold 220. In an example, if the cross-correlation value for the window exceeds the adaptive threshold 220, it is determined to be representative of noise; if the cross-correlation value for the window is less than or equal to the adaptive threshold 220, it is determined to be representative of a signal transmitted in the upstream path, such as a signal transmitted from one of the cable modems 54 to the headend.

The threshold 220 may be adaptive to compensate for different power levels and other factors that may vary depending on the location of the test point in the network 101 where the test instrument 100 is connected for measuring the upstream signal parameters. For example, after initializing the adaptive threshold 220 to a fixed number, the adaptive threshold 220 may be changed based on the signal level and the noise floor for the test point. For example, based on a noise and a signal profile, a multiple of a geometric mean of the difference between noise and signal level may be set as the new threshold value for the adaptive threshold 220.

The incoming signal (e.g., upstream signal) is normalized over its total energy over the entire channel frequency band. The total energy may be calculated by summing energy levels over the entire channel bandwidth. The normalized frequency spectrum is then correlated to calculate the cross-correlation value. The cross-correlation value is compared to the adaptive threshold 220.

At 504, an interference profile is generated from the frequency spectrum data that represents the noise. For example, the FFT data for each window that is determined to represent noise is accumulated over a predetermined time interval and is included in the interference profile. In an example, the FFT data for the noise is filtered to remove outliers before generating the interference profile. For example, a median filter may be applied to the FFT data to remove outliers which may be caused by artifacts generated by overlapping windowed FFTs of the bursty upstream channel. These artifacts are added to the FFTs due to lack of synchronization to the source of the signal and finite length of window. To aggregate the FFT data for the noise, the FFT data for the noise is collected. Consider the signal energy at each frequency bin for the entire upstream channel bandwidth, wherein each frequency bin is a frequency interval of predetermined size within the channel bandwidth. A window may include the frequency bins within the targeted channel. For example, the upstream bandwidth may be between 0-200 MHz and these frequencies are divided into consecutive frequency bins. Assume a targeted channel has a 6 MHz range. The window for the targeted channel includes the frequency bins that fall within the targeted channel. Within this window, the collected data composed of energy levels is called an FFT trace. Each FFT trace for different snapshots of time represents the energy spectral for all the frequency bins of the window for the targeted channel, then the aggregation of FFT traces over time provides the power spectral density which describes how the power of signal is distributed over frequency. This power spectral density is calculated by adding the aforementioned FFT traces and dividing the result over the time (e.g., average).

The test instrument 100 calculates the power spectral density of the signal and the power spectral density of the noise for the bursty channel. To do this, the test instrument 100 distinguishes between signal FFT traces and noise FFT traces. The power spectral density of QAM signal is cyclostationary and has a predefined shape (QAM profile) and therefore the aggregation of signal FFT traces resembles the QAM profile. That is how the signal FFT traces are identified. Any other traces that does not comply to the QAM profile are aggregated separately as the noise FFT traces. These traces are used to build the interference or noise profile. The interference profile may be filtered by a median filter before being displayed on the display 313.

Figure 6:
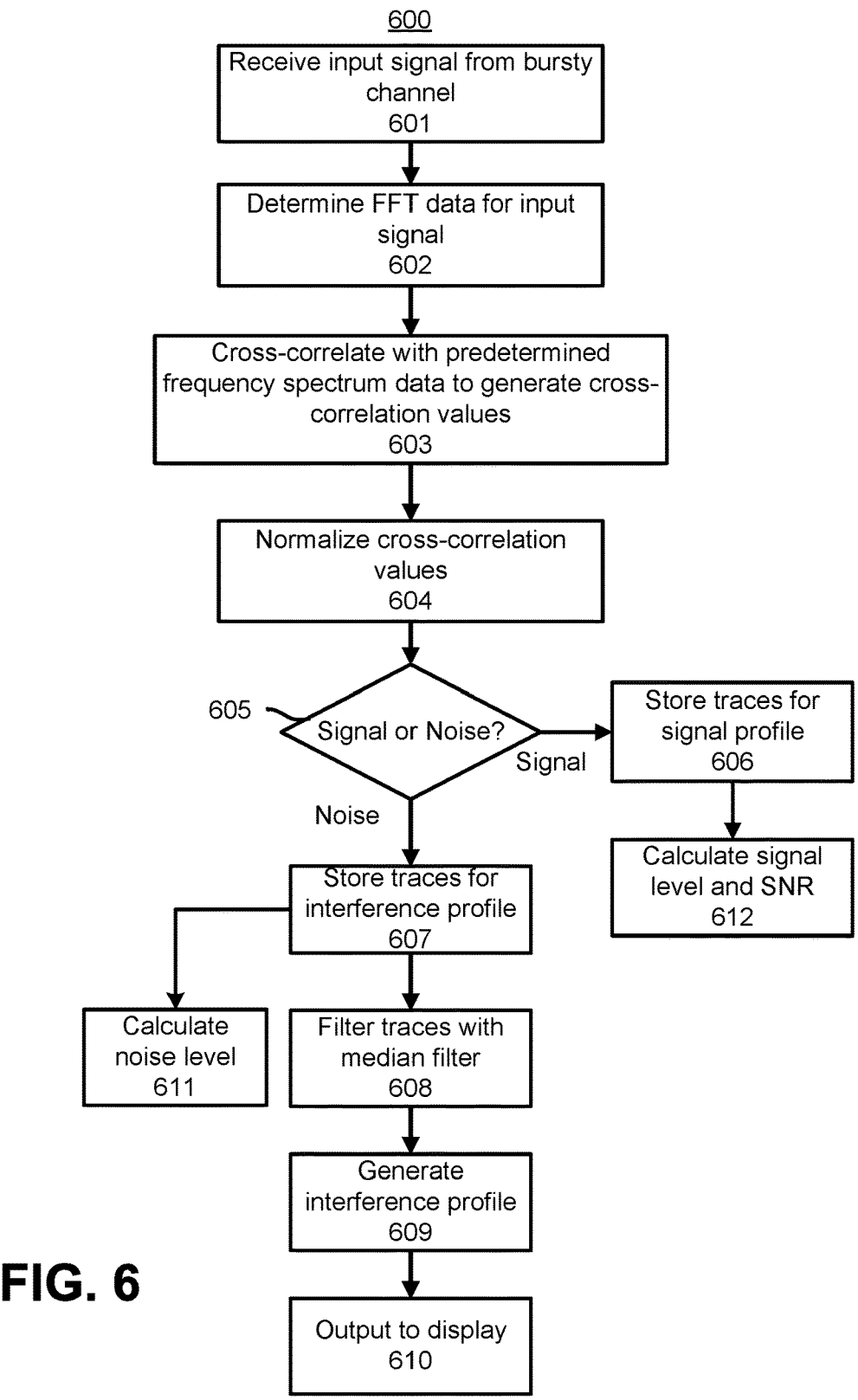

The FFT data that is determined to be for the signal instead of noise may also be accumulated, which is further described with respect to FIG. 6. Accumulating may include storing in data storage 451. The processing circuit 450 may determine signal level and SNR for the signal based on the FFT data for the signal. The signal level may be used to modify the adaptive threshold 220.

FIG. 6 illustrates a method 600 according to another example. The method 600 includes steps that are the same or similar to steps of the method 500 and further includes additional steps for generating interference profiles and signal profiles. Similar to the method 500, steps of the method 600 may be performed by the test instrument 100 or other systems. Each block shown in FIG. 6 may further represent one or more processes, methods, or subroutines, and one or more of the blocks may include machine readable instructions stored on a non-transitory computer readable medium and executed by a processor or other type of processing circuit to perform one or more operations described herein.

At 601, an input signal from a bursty channel is received. The test instrument 100 may be connected to a bursty channel (e.g., upstream channel) in the network 101 via the test point 105. The test instrument 100 receives an input signal from the upstream channel.

At 602, FFT data is determined for the input signal. For example, the ADC 310 is connected to a QAM demodulator in the receiver circuit 442, which demodulates signals received via a port of the test instrument 100 connected to the test point 105. The frequency spectrum analyzer 311 receives an input signal from ADC 310 and determines the FFT data for the input signal. For example, the FFT data for the input signal is determined for a plurality of overlapping windows.

At 603, the FFT data for the input signal is cross-correlated with predetermined frequency spectrum data to generate cross-correlation values. Steps 601-603 may be the same or similar to steps 501 and 502 of the method 500. For example, the FFT data for the input signal is determined for a plurality of overlapping windows, and the FFT data for each window is cross-correlated with the predetermined frequency spectrum data to determine a cross-correlation value for each window.

At 604, the cross-correlation values are normalized. At 605, the normalized cross-correlation values are compared to the adaptive threshold 220, similar to as described with respect to step 503, to determine whether each cross-correlation value represent a signal or noise. For example, if a cross-correlation value is greater than the adaptive threshold 220, it is considered to represent noise; otherwise, the cross-correlation value is considered to represent a signal, such as a signal transmitted from one of the cable modems 54 to the headend 21.

At 606, if a cross-correlation value is determined to be representative of a signal, FFT data for the window, which may be referred to as a trace, that is associated with the cross-correlation value is stored in memory for building a signal profile. Otherwise, at 607, the FFT data is stored in memory for building an interference profile. At 606 and 607, traces are continually identified for building the signal profile or the interference profile.

For the traces identified for the interference profile, at 608, the traces may be filtered using a median filter. For example, a median filter may be applied to the FFT data to remove outliers which may be caused by artifacts generated by overlapping windowed FFTs of the bursty upstream channel. At 609, the interference profile is generated from the filtered traces, such as described with respect to step 504. At 610, the interference profile is output to the display 313. Also, at 611, a noise level is calculated from the traces determined to represent noise. In absence of other interference, the noise profile represents the noise floor of the measurement system. The noise level may be displayed on the display 313 and may be used to modify the adaptive threshold 220.

For the traces identified for the signal profile, at 612, a signal level and SNR may be calculated from the traces. The transmitted power levels are calculated based on Parseval's theorem; for each frequency bin the squared magnitude of corresponding value (e.g., energy) from the FFT trace is determined. Then over the entire channel bandwidth, the energy levels are summed and divided over time to determine power. For example, the energy levels associated with each FFT trace for the targeted channel are averaged over time to estimate the power level for the particular channel. The next step is to normalize the power level for the entire channel bandwidth. Frequency bin sizes are defined by the resolution bandwidth filter (RBW) used in the measurement device. Knowing the RBW filter resolution, the signal power level for the specific bandwidth can be normalized. This is done by multiplying the power level by a factor of channel bandwidth (e.g. 5.056941 MHz) over RBW resolution (e.g. 100 KHz). To determine the SNR, the power level for the signal determined from the signal FFT traces is divided by the power level of the noise determined from the noise FFT traces. The signal level and SNR and signal profile may be displayed on the display 313 and may be used to modify the adaptive threshold 220.

The adaptive threshold 220 is modified based on the signal level and noise level determined at 611 and 612. Once the signal power level and noise level are determined, the adaptive threshold is set to a factor of geometric mean of the two levels. Instead of the geometric mean, other types of means may be used for the median filter. This ensures any interference below the signal power level is accurately designated as a noise trace.

Figure 7A:
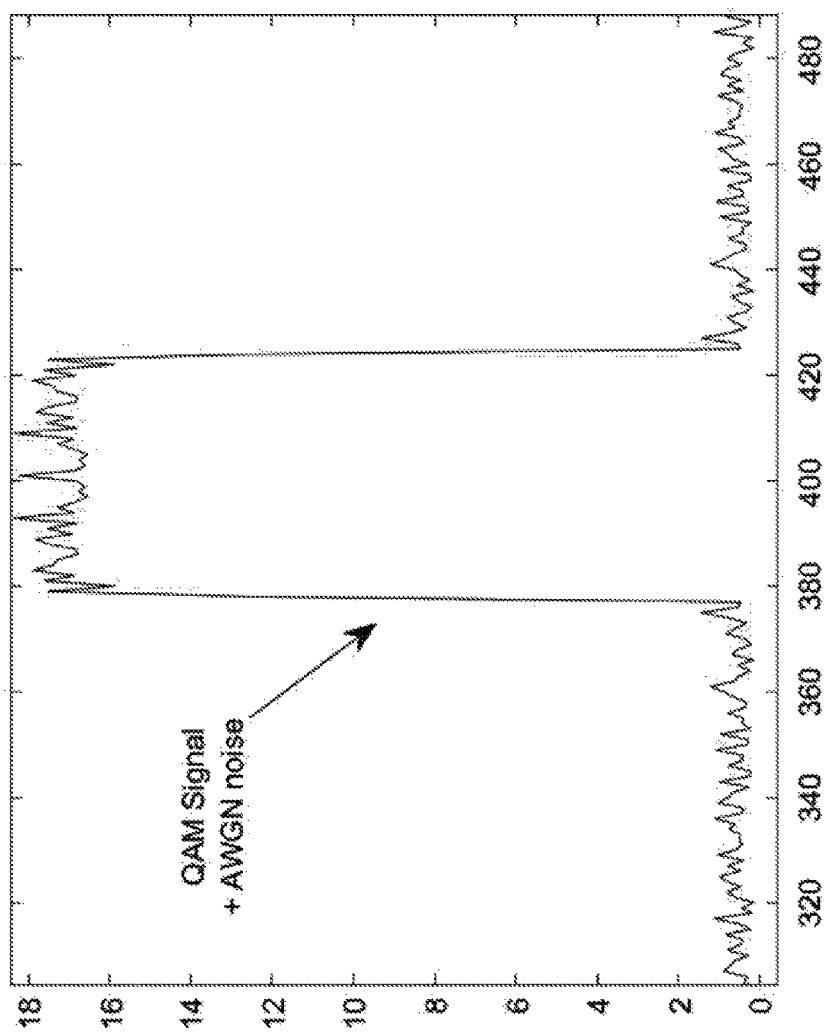
FIGS. 7A-B illustrate profiles, according to examples of the present disclosure.
Figure 7B:
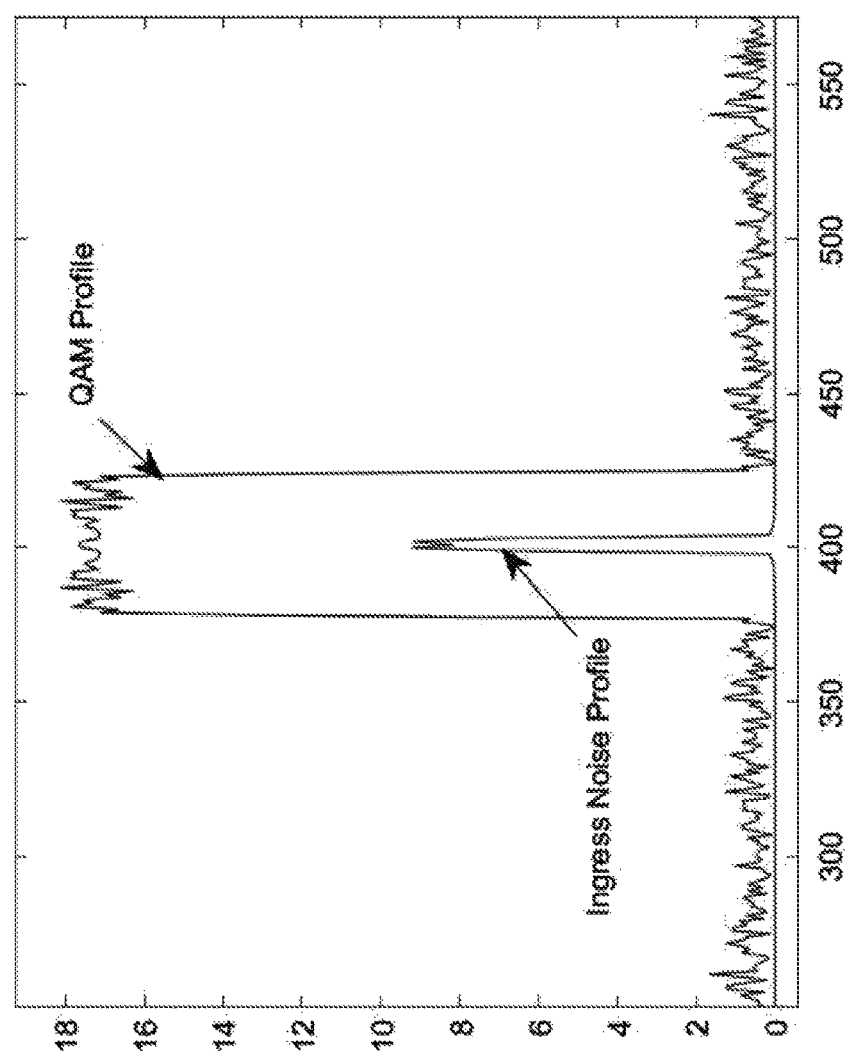

FIGS. 7A-B illustrate examples of profiles. For example, the y-axis represents millivolts and the x-axis represents frequency bins. The y-axis could easily be converted to power such as milliwatts. FIG. 7A shows an example of a signal profile. The signal profile for example includes the profile for a signal transmitted in the upstream channel and the noise (e.g., additive white Gaussian noise (AWGN)) on the channel. The additive white Gaussian noise (AWGN) is indistinguishable from the actual QAM signal. As indicated above, the upstream channel is bursty which means that at certain times no signals may be transmitted in the upstream channel but noise may be present at these times. Also as is discussed above, the test instrument 100 distinguishes when a signal is transmitted in the upstream channel and when no signal is transmitted in the upstream channel. The noise profile is built from noise FFT traces when no signal is transmitted in the upstream channel. FIG. 7B shows the noise profile (labeled as ingress noise profile). FIG. 7B also shows the signal profile from FIG. 7A. For example, the display 313 of the test instrument 100 may show the determined profile, which may be signal or noise, for different snapshots which may be short such as a few milliseconds. Because the snapshots can occur quickly, the display 313 may show profiles determined for different snapshots simultaneously such as shown in FIG. 7B. However, the profiles may be shown in different colors to distinguish them from each other. The particular shape of the ingress interference profile may indicate, suggest, or correspond to a source or root cause of noise or signal impairment, which is helpful to a technician. For instance, the shape of the interference may indicate that signal interference in the channel may be the result of short radio wave radio, excessive gain on a path, device malfunction, broadband noise from appliances, etc. Accordingly, the technician may utilize the noise profile identified and displayed by the test instrument 100 to determine the source of the noise.

Monitoring SNR as a measure of quality of channel plays an important role in installation and maintenance of cable networks. While this measure can warn of the problems in the channel, SNR does not necessarily indicate the root cause of the problem. For maintenance purposes, the interference profile, which for example includes the noise power spectral density of the channel, can be helpful for several reasons: the interference profile can be used to identify the obtrusive ingress source using the shape of profile; the interference profile also indicates the affected frequencies which can be avoided by adjusting the upstream channel to step around the troubled frequencies; and the interference profile can also help to isolate the spurious noise sources. The shape of the interference profile may be able to help identify the source of the noise. For example, if the shape looks like the shape of a QAM signal profile of an adjacent channel, then the source of the noise may be from the adjacent channel. In another example, the shape may be that of a continuous wave, and then the source of the noise may be other communication signals located on the same RF frequency. Looking at the frequency domain response characteristics can thus help identify the noise source.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A test instrument connectable to a cable television network to provide an interference profile of a bursty channel, the test instrument comprising:
    a port connectable to a test point in the cable television network, wherein the test point is located downstream from a headend in the cable television network;
    a processing circuit to:
        determine frequency spectrum data of a signal in the bursty channel that is received at the test instrument via the port;
        cross-correlate the frequency spectrum data with predetermined frequency spectrum data to generate cross-correlation values;
        determine the frequency spectrum data that represents noise based on a comparison of the cross-correlation values to a threshold; and generate the interference profile from the frequency spectrum data that represents the noise.

2. The test instrument of claim 1, wherein to determine frequency spectrum data of the signal received at the port, the processing circuit is to:
convert the received signal to a digital signal; and
calculate a Fast Fourier Transform (FFT) of the received signal for a discrete time window of finite length.

3. The test instrument of claim 2, wherein to cross-correlate the frequency spectrum data with predetermined frequency spectrum data, the processing circuit is to:
cross-correlate the FFT for the window with the predetermined frequency spectrum data to determine a cross-correlation value for the window.

4. The test instrument of claim 3, wherein to determine the frequency spectrum data that represents noise, the processing circuit is to:
compare the cross-correlation value for the window with the threshold; and
determine whether the FFT for the window is representative of the noise or a signal transmitted in the bursty channel based on the comparison.

5. The test instrument of claim 4, wherein to generate an interference profile, the processing circuit is to:
in response to determining the FFT for the window is representative of the noise, accumulate the FFT for the window with FFT for other windows that are determined to be representative of the noise; and
generate the interference profile from the accumulated FFTs.

6. The test instrument of claim 1, wherein to generate an interference profile, the processing circuit is to:
for the frequency spectrum data determined to be representative of the noise, aggregate frequency spectrum data for a plurality of overlapping time windows;
subtract cyclostationary portions of the aggregated frequency spectrum data;
filter outliers of the aggregated frequency spectrum data having the subtracted cyclostationary portions; and
generate the interference profile from the filtered, aggregated frequency spectrum data.

7. The test instrument of claim 1, wherein to determine the frequency spectrum data that represents noise, the processing circuit is to normalize the cross-correlation values prior to comparing the comparing the cross-correlation values to the threshold.

8. The test instrument of claim 1, wherein the threshold is updated based on a signal level and a noise floor determined for signals received at the test point.

9. The test instrument of claim 1, comprising a display, wherein the processing circuit is to output the interference profile to the display.

10. The test instrument of claim 1, wherein the frequency spectrum data comprises FFT data.

11. The test instrument of claim 1, wherein the interference profile has a shape that is indicative of a source of signal interference in the bursty channel.

12. A test instrument connectable to a bursty channel in a network, the test instrument comprising:
a receiver circuit to receive a radio frequency signal from the bursty channel;
an analog-to-digital converter to convert the received signal to a digital signal;
a spectrum analyzer to determine a power spectral density of the digital signal in a frequency domain; and
a processing circuit to:
cross-correlate the power spectral density of the digital signal with predetermined frequency spectrum data to generate cross-correlation values;
determine whether the cross-correlation values are each representative of noise in the bursty channel or a signal transmission in the bursty channel; and
generate an interference profile of the bursty channel from traces associated with the cross-correlation values determined to be representative of the noise.

13. The test instrument of claim 12, wherein the traces associated with the correlation values determined to be representative of the noise comprise FFTs of the digital signal determined by the spectrum analyzer.

14. The test instrument of claim 12, wherein the processing circuit is to filter the traces with a median filter prior to generating the interference profile from the traces.

15. The test instrument of claim 12, wherein the cross-correlation values each comprise a cross-correlation of a power spectral density of the digital signal for a finite time window with a predetermined power spectral density.

16. The test instrument of claim 12, wherein to determine whether the cross-correlation values are each representative of noise in the bursty channel or a signal transmission in the bursty channel, the processing circuit is to:
compare each cross-correlation value to a threshold; and
determine, for each cross-correlation value, whether the cross-correlation value is associated with the noise or the signal transmission based on the comparison.

17. The test instrument of claim 16, wherein the processing circuit is to normalize the cross-correlation values prior to comparing the cross-correlation values to the threshold.

18. The test instrument of claim 16, wherein the threshold is updated based on a signal level and a noise floor determined for a signal received from the bursty channel.

19. The test instrument of claim 12, wherein for the cross-correlation values determined to be representative of the signal transmission in the bursty channel, the processing circuit is to determine at least one of a signal level and a signal-to-noise ratio from traces associated with the cross-correlation values determined to be representative of the signal transmission.

20. A method executable by a test instrument to provide an interference profile of a channel, the method comprising:
determining frequency spectrum data of a signal received from the channel;
cross-correlating the frequency spectrum data with predetermined frequency spectrum data to generate cross-correlation values;
comparing the cross-correlation values to a threshold to determine the frequency spectrum data that is representative of noise in the channel;
generating an interference profile that is representative of the noise; and
outputting the interference profile to a display of the test instrument.

* * * * *